United States Patent
Fuerhapter et al.

(10) Patent No.: US 12,209,642 B2
(45) Date of Patent: Jan. 28, 2025

(54) COAXIAL TRANSMISSION HAVING A COMMON, STAR-SHAPED CONNECTING ROD

(71) Applicant: Kraken Innovations GmbH, Graz (AT)

(72) Inventors: Daniel Fuerhapter, Graz (AT); Lukas Dietrich, Graz (AT); Philipp Eisele, Wiener Neustadt (AT)

(73) Assignee: Kraken Innovations GmbH, Graz (AT)

( * ) Notice: Subject to any disclaimer, the term of this patent is extended or adjusted under 35 U.S.C. 154(b) by 0 days.

(21) Appl. No.: 18/698,472

(22) PCT Filed: Oct. 27, 2022

(86) PCT No.: PCT/EP2022/080148
§ 371 (c)(1),
(2) Date: Apr. 4, 2024

(87) PCT Pub. No.: WO2023/088656
PCT Pub. Date: May 25, 2023

(65) Prior Publication Data
US 2024/0328487 A1  Oct. 3, 2024

(30) Foreign Application Priority Data
Nov. 16, 2021 (WO) ............... PCT/EP2021/081890

(51) Int. Cl.
*F16H 25/06* (2006.01)
*F16H 25/20* (2006.01)

(52) U.S. Cl.
CPC ......... *F16H 25/06* (2013.01); *F16H 25/2003* (2013.01); *F16H 2025/2037* (2013.01)

(58) Field of Classification Search
CPC ............................ F16H 25/06; F16H 25/2003
See application file for complete search history.

(56) References Cited

U.S. PATENT DOCUMENTS 1,543,791 A   6/1925  Pitter
5,351,568 A  10/1994  Feterl
(Continued)

FOREIGN PATENT DOCUMENTS

AT       521617 B1   3/2020
CN      2327841 Y    7/1999
(Continued)

OTHER PUBLICATIONS

International Preliminary Report on Patentability in PCT/EP2022/080148 mailed May 30, 2024 with English translation.
(Continued)

*Primary Examiner* — William C Joyce
*Assistant Examiner* — Gregory T Prather
(74) *Attorney, Agent, or Firm* — Collard & Roe, P.C.

(57) ABSTRACT

A coaxial transmission includes a crankshaft rotated about an axis of rotation; at least one crank pin; at least one piston set having a plurality of pistons each having a toothing at a first end facing away from the axis of rotation; a hollow shaft having an inner toothing wherein the pistons are disposed within the hollow shaft; a guide unit wherein the pistons are linearly guided in the guide unit and movable back and forth parallel to a radial direction which is perpendicular to the axis of rotation. The toothings of the first ends of the pistons can be brought into engagement with the inner toothing and disengagement from the inner toothing. A common, star-shaped connecting rod is provided to connect the pistons of each set to the crank pin.

16 Claims, 6 Drawing Sheets

(56) References Cited

U.S. PATENT DOCUMENTS

| 8,256,327 | B2 | 9/2012 | Schreiber |
| 8,307,738 | B2 | 11/2012 | Schmidt et al. |
| 10,683,922 | B2 | 6/2020 | Schreiber et al. |
| 11,892,061 | B2 | 2/2024 | Eisele et al. |
| 2010/0024593 | A1* | 2/2010 | Schmidt ................. F16H 25/06 74/640 |

FOREIGN PATENT DOCUMENTS

| CN | 101627228 A | 1/2010 |
| CN | 101652582 A | 11/2012 |
| CN | 106051061 A | 10/2016 |
| GB | 153 982 A | 11/1920 |
| GB | 400 282 A | 10/1933 |
| RU | 2 165 552 C2 | 4/2001 |
| WO | 2021/018752 A1 | 2/2021 |

OTHER PUBLICATIONS

International Search Report in PCT/EP2022/080148, mailed Feb. 6, 2023.

* cited by examiner

COAXIAL TRANSMISSION HAVING A COMMON, STAR-SHAPED CONNECTING ROD

CROSS REFERENCE TO RELATED APPLICATIONS

This application is the National Stage of PCT/EP2022/080148 filed on Oct. 27, 2022, which claims priority under 35 U.S.C. § 119 of PCT/EP2021/081890 filed on Nov. 16, 2021, the disclosure of which is incorporated by reference. The international application under PCT article 21(2) was not published in English.

FIELD OF THE INVENTION

The present invention relates to a coaxial transmission, comprising a crankshaft which can be rotated about an axis of rotation and has at least one crank pin, the coaxial transmission further comprising at least one piston set which has a plurality, preferably at least three, pistons which each have a toothing with at least one tooth on a first end face facing away from the axis of rotation, the coaxial transmission further comprising a hollow shaft having an internal toothing, wherein the pistons are arranged within the hollow shaft when viewed in a plane normal to the axis of rotation, the coaxial transmission further comprising a guide unit, wherein the pistons are each guided linearly in the guide unit and can be moved back and forth parallel to a radial direction normal to the axis of rotation, whereby the toothings of the first end faces of the pistons can be brought successively into engagement with the internal toothing and into a state disengaged from the internal toothing in order, during the respective engagement, preferably with planar contact between the respective toothing and the internal toothing, to further rotate the hollow shaft or the guide unit about the axis of rotation.

DESCRIPTION OF THE PRIOR ART

A crankshaft or coaxial transmission is known from AT 521617 B1, comprising a crankshaft rotatable about an axis of rotation having at least one connecting rod bearing or crank pin, further comprising a plurality of pistons, for example three, pistons, each of which is connected to the at least one crank pin by means of a connecting rod and each of which has a toothing with at least one tooth on a first end face facing away from the axis of rotation, the coaxial transmission further comprising a hollow shaft with internal toothing, wherein the pistons are arranged within the hollow shaft when viewed in a plane normal to the axis of rotation, the coaxial transmission further comprising a guide unit, wherein the pistons are each linearly guided in the guide unit and can be moved back and forth parallel to a radial direction normal to the axis of rotation, whereby the toothings of the first end faces of the pistons can be brought successively into engagement with the internal toothing and into a state disengaged from the internal toothing, in order to further rotate the hollow shaft or the guide unit about the axis of rotation during the respective engagement with planar contact between the respective toothing and the internal toothing. With this coaxial transmission, high torques can be transmitted with a small size, wherein a high transmission ratio and high accuracy or zero backlash can be achieved. In order to make the force transmission as homogeneous as possible, an increased number of pistons must be provided, which, however, is accompanied by a corresponding increase in the overall length of the coaxial transmission measured parallel to the axis of rotation, which can prove to be disadvantageous depending on the application. In addition, the increased number of components increases the complexity of the system accordingly, which can also be considered disadvantageous with regard to deviations due to manufacturing tolerances.

OBJECT OF THE INVENTION

It is the object of the present invention to provide an improved coaxial or crankshaft transmission which overcomes the above-mentioned disadvantages.

SUMMARY OF THE INVENTION

In order to solve the said object, it is provided according to the invention in a coaxial transmission comprising a crankshaft which can be rotated about an axis of rotation and has at least one crank pin, the coaxial transmission further comprising at least one piston set which has a plurality, preferably at least three, pistons which each have a toothing with at least one tooth on a first end face facing away from the axis of rotation, the coaxial transmission further comprising a hollow shaft having an internal toothing, wherein the pistons are arranged within the hollow shaft when viewed in a plane normal to the axis of rotation, the coaxial transmission further comprising a guide unit, wherein the pistons are each guided linearly in the guide unit and can be moved back and forth parallel to a radial direction normal to the axis of rotation, whereby the toothings of the first end faces of the pistons can be brought successively into engagement with the internal toothing and into a state of disengagement from the internal toothing in order, during the respective engagement, preferably with planar contact between the respective toothing and the internal toothing, to further rotate the hollow shaft or the guide unit about the axis of rotation, that a common, star-shaped connecting rod, to which the pistons of the respective piston set are coupled, is provided in each case for connecting the pistons of the respective piston set to the at least one crank pin, in order to be able to avoid an offset of the pistons of the respective piston set relative to one another along the axis of rotation.

This means that one star-shaped connecting rod, also referred to below as a "star connecting rod", is available for each piston set. Another possible designation for the star-shaped connecting rod would be "star connector". Accordingly, "piston set" includes those pistons that are connected to the common or to the same star connecting rod.

In turn, a separate crank pin can be provided for each star connecting rod; however, a plurality of star connecting rods per crank pin is also theoretically possible, whereby even more pistons can be provided overall with compact dimensions of the coaxial transmission in order to further increase or improve the uniformity, torque capacity and power transmission. The respective crank pin can also be referred to as a crank journal.

The crank pin represents an eccentric. Therefore, in the context of the present invention, crank pins or eccentrics of an eccentric shaft can also be meant. Consequently, in the context of the present invention, "crankshaft" is in principle also to be understood as an "eccentric shaft" and vice versa—irrespective of the fact that eccentric shafts are usually supported on cantilever bearings, whereas crankshafts are usually supported on both sides.

By arranging a plurality of star connecting rods one behind the other along the axis of rotation on different crank pins, other or lower ratios can be easily achieved.

The star connecting rod—like any ordinary connecting rod, sometimes also referred to as a "push rod"—serves to convert the rotation of the crankshaft into the linear movement of the pistons, wherein the star connecting rod—in contrast to the crank pin forming an eccentric—does not itself rotate relative to the guide unit in a plane normal to the axis of rotation (around the axis of rotation), but performs an orbital movement in this plane. Said orbital movement in the plane normal to the axis of rotation stems from the eccentricity and can be regarded as a parallel displacement relative to the guide unit, which is superimposed to a certain degree by a kind of wobbling movement.

The star connecting rod mediates both the "forward stroke", i.e. the movement of the pistons towards the internal toothing of the hollow shaft, and the so-called "return stroke", i.e. the movement of the pistons away from the internal toothing of the hollow shaft. The fact that the pistons are also returned by means of the star connecting rod (return stroke) can be seen as a significant advantage over solutions without a connecting rod. In particular, this allows the coaxial transmission to be installed in practically any position, as there is no risk of pistons that are not currently engaged with the internal toothing falling back due to gravity and thus coming into unplanned re-engagement with the internal toothing.

Although falling back can also be prevented in solutions with cam disks, a multiple eccentricity of the cam disk must be implemented for this, resulting in a cross-section of the cam disk that deviates from the circular shape (polygonality of the cam disk). The disadvantage of this is that the possible transmission ratio is reduced (transmission ratio i=number of teeth/polygonality; accordingly, the transmission ratio is halved for polygonality 2, reduced to a third for polygonality 3, etc.). This means that the star connecting rod also eliminates the disadvantage of the reduced transmission ratio.

Furthermore, in the coaxial transmission according to the invention, there is also no sliding of a cam disk on a sliding surface of the respective piston facing the cam disk. This is also advantageous, since it is usually necessary to design the sliding surface of the pistons to be strongly rounded in order to optimize sliding, which in turn is to be regarded as a restriction that is not necessary in the coaxial transmission according to the invention.

By providing only a single, star-shaped connecting rod for all pistons in a piston set, the overall length of the coaxial or crankshaft transmission measured parallel to the axis of rotation can be dramatically reduced because the pistons can be arranged essentially offset-free relative to each other along the axis of rotation. Theoretically, of course, it cannot be ruled out that there may be a certain amount of offset, e.g. due to manufacturing tolerances. In addition, a slight offset could also be provided in a planned manner, e.g. again for manufacturing reasons.

In any case, the number of components is reduced accordingly because a separate connecting rod does not have to be provided for each piston, which reduces the complexity of the system and thus has an advantageous effect with regard to deviations due to manufacturing tolerances.

This means that a large number of pistons can be used without any problems, enabling a particularly homogeneous application of force on the one hand and extremely high torques to be transmitted on the other.

Furthermore, the following also applies to the coaxial transmission or crankshaft transmission according to the invention: The crankshaft is a drive element or can be called a drive element.

Preferably, the crankshaft is arranged at least in sections inside the hollow shaft when viewed in a plane normal to the axis of rotation.

The hollow shaft is preferably mounted so that it can rotate around the axis of rotation and can act as an output element.

Alternatively, with a fixed hollow shaft, the guide unit can act as an output element, for which the guide unit must be rotatably mounted.

In order to be able to rotate the hollow shaft or optionally the guide unit in a certain direction, at least three pistons are preferably provided. For example, an integer multiple N of three can be selected, for example nine (i.e. for N=3)—however, the exact number is not subject to any restrictions in principle and therefore does not need to be an integer multiple of three. The exact number can be adapted to the respective application, in particular with regard to the desired efficiency and the system pretension, which is important for the starting torque of the coaxial transmission.

Further rotation is achieved by pressing the toothing of the first end face of at least one piston against the internal teeth of the hollow shaft, in particular over a large area, while the other pistons exert little or no pressing force on the internal toothing.

The behavior of the pistons with regard to how many pistons are in engagement with the internal toothing, when and to what extent, can be designed very variably. With 3N pistons, for example, N pistons can be in engagement with the internal toothing and press against it. Meanwhile, the remaining 2N pistons exert no or only a low pressing force on the internal toothing. Preferably, at least 1N of the remaining 2N pistons is partially engaged with the internal toothing in order to generate zero backlash. Preferably, at least one of the remaining pistons does not touch the internal toothing at all.

It should be noted that by designing the coaxial transmission according to the invention accordingly, the exact number of pistons in engagement or partial engagement with the internal toothing can be varied practically at will in order to ensure zero backlash.

In general, in the case of several pistons, zero backlash can be ensured by the simultaneous, at least partial engagement of at least two pistons with the internal toothing, wherein preferably one of the two pistons mentioned is in the forward stroke and the other is in the return stroke.

This mode of operation results in a very high transmission ratio.

As described, planar contact between the toothing of the respective first end face and the internal toothing of the hollow shaft is possible. The prerequisite for this is the linear movement of the pistons. In addition, the toothings and the internal toothing can be geometrically designed or optimized accordingly in order to further increase the pressing or the planar contact—and thus the transmission of high torques. In contrast to solutions with linear contact or linear engagement known from the prior art, very high torques can be transmitted from the crankshaft to the hollow shaft or optionally the guide unit due to the planar pressing or the planar contact between the toothing of the respective first end face with the internal toothing of the hollow shaft. Furthermore, the Hertzian pressure is reduced by the flat pressing or the flat contact, which extends the service life.

It should be noted that the geometry of the toothings or the internal toothing can also be designed in the present coaxial transmission in such a way that linear contact occurs despite linear movement of the pistons, which can be advantageous if a reduction in friction (and thus an increase in efficiency) is desired.

The convenient option of increasing the number of pistons in this case also provides a further increase in the amount of torque that can be transmitted.

With at least three pistons, it can be ensured that the next piston, which presses with the toothing of its first end face against the internal toothing, in particular planar, does not rotate the hollow shaft or optionally the guide unit back in the opposite direction and merely causes the hollow shaft or optionally the guide unit to oscillate back and forth around the axis of rotation. Such a case cannot be ruled out in principle with two pistons, but with two pistons an additional element, e.g. a type of escapement or a freewheel, can be provided, which only allows the hollow shaft or optionally the guide unit to rotate in a certain direction, thus allowing the hollow shaft or optionally the guide unit to continue rotating even with only two pistons.

The toothing of the first end faces can also be referred to as toothing embossed on the first end face. Accordingly, the respective piston could also be referred to as a "toothed element".

The guide unit can be constructed in one piece or composed of several elements.

Due to the linear guidance of the pistons in the guide unit, the pistons only move linearly parallel to the respective radial direction, wherein the radial direction assigned to the respective piston is defined by the guide unit.

The linear guides can be formed in particular by hollow cylinders in the guide unit in which the pistons are arranged. In this case, the radial direction assigned to the respective piston is defined by the respective cylinder axis. Typically, the pistons have an essentially circular cross-sectional area (normal to the respective radial direction). In principle, however, other cross-sectional shapes of the pistons are also possible, for example rectangular or slotted cross-sectional areas, in particular in order to increase the "depth" of the toothing (i.e. its dimensioning parallel to the axis of rotation) and thus the transmittable forces. It should be noted again that cases are possible in which the guide unit is not fixed but can rotate. Accordingly, the radial directions assigned to the pistons then change due to the rotation of the guide unit or, strictly speaking from a mathematical standpoint, there are an infinite number of radial directions over a period of time in which the guide unit rotates.

Furthermore, due to the high transmission ratio and friction in the tooth contact, the coaxial transmission is also fundamentally self-locking in the event of a drive failure. In particular, the coaxial transmission can be locked by one of the pistons remaining at top dead center, i.e. at maximum advance of the piston in the respective radial direction away from the axis of rotation, whereby the functionality of a brake can be realized. Solutions without connecting rods do not usually allow such locking.

A further advantage of the coaxial transmission is that high dynamics are made possible because the at least one crank pin of the crankshaft describes a circular movement around the axis of rotation and preferably itself has a circular cross-section perpendicular to the axis of rotation, so that mass balancing can be realized very easily, for example in a manner known per se by means of balancing weights or bores on the crankshaft.

In a preferred embodiment of the coaxial transmission according to the invention, it is provided that a plurality of piston sets is provided, wherein a common connecting rod of star-shaped design is provided for each piston set, to which the pistons of the respective piston set are coupled. Both the homogeneity of the force transmission and the magnitude of the transmittable torques can be further increased without having to increase the overall length excessively.

In order to prevent the star-shaped connecting rod from rotating (or twisting) relative to the guide unit beyond the orbital movement described above in a particularly simple design manner, in a preferred embodiment of the coaxial transmission according to the invention it is provided that, at least two guide pins are provided for securing an orbital movement and against further rotation relative to the guide unit of the respective star-shaped connecting rod, which are rigidly connected to the respective star-shaped connecting rod and are in engagement with at least one corresponding recess of at least one guide section, which is arranged immovably relative to the guide unit Preferably, each guide pin is assigned a corresponding recess.

The at least one guide section can be a part that is fundamentally separate from the guide unit. Alternatively, the at least one guide section can be a part of the guide unit and/or can be formed in one piece with the guide unit.

The at least two guide pins can be arranged within the guide unit when viewed in a plane normal to the axis of rotation, resulting in a particularly compact arrangement.

The dimensions of the at least one corresponding recess can of course be adapted to the eccentricity of the crank pin or the crank. For example, if a corresponding recess is provided for each guide pin, the respective corresponding recess can be designed as a bore with a correspondingly adapted diameter, in particular by selecting the size of the bore diameter to be equal to twice the eccentricity plus the diameter of the guide pin. Accordingly, the respective guide pin is then always in tangential contact with the associated recess or the guide section.

In order to minimize frictional losses between the guide pin and the recess or guide section, it is provided in a particularly preferred embodiment of the coaxial transmission according to the invention that rollers are provided on the guide pins in order to facilitate rolling on the at least one guide section when the guide pins move in the at least one corresponding recess. This means that the respective guide pin does not slide on the guide section, but rolls on the at least one guide section by means of one or more rollers.

The coupling between the piston and the star connecting rod can be realized in a wide variety of ways. In order to realize a particularly simple coupling in terms of design, in a preferred embodiment of the coaxial transmission according to the invention it is provided that for coupling the pistons of the respective piston set to the associated star-shaped connecting rod, slotted holes are provided in the pistons, which slotted holes extend transversely to the respective radial direction, wherein coupling bolts are fastened to the star-shaped connecting rod and engage with the slotted holes.

This type of coupling proves to be particularly space-saving, so that the crankshaft can have a correspondingly large diameter, which is not only advantageous in terms of mechanical stability, but also allows a particularly large amount of space for the passage of cables or the like, especially without twisting, if the crankshaft is hollow.

Preferably, the slotted holes extend normal to the radial directions of the respective pistons. However, it is also conceivable that the course of the respective slotted hole is not straight, but curved.

Preferably, the coupling bolts or their longitudinal axes run parallel to the axis of rotation.

The coupling bolts are arranged in the slotted holes of the pistons, whereby the engagement is realized. The pistons therefore move according to the principle of a crank loop.

In a particularly preferred embodiment of the coaxial transmission according to the invention, it is provided that at least one of the coupling bolts also forms at least one guide pin. This further reduces the number of parts, which saves space, weight and costs. Preferably, at least two of the coupling bolts form the at least two guide pins. It is particularly preferred that all guide pins are formed by coupling bolts.

In order to realize an alternative type of coupling between the piston and the star-shaped connecting rod, which is structurally simple, it is provided in a preferred embodiment of the coaxial transmission according to the invention that for coupling the pistons of the respective piston set to the associated star-shaped connecting rod, intermediate members are provided which are essentially of rigid design, wherein each intermediate member is connected in an articulated manner to the associated piston on the one hand and is connected in an articulated manner to the star-shaped connecting rod on the other hand. This allows the star-shaped connecting rod to move with particularly low friction so that power losses are minimized.

The articulated connection between the respective intermediate member and the associated piston can, for example, be realized in a manner known per se by means of a pivot joint or a solid-state joint. A pivot joint or a solid-state joint can also be provided, for example, for the articulated connection between the respective intermediate member and the associated star-shaped connecting rod.

In a particularly preferred embodiment of the coaxial transmission according to the invention, it is provided that connecting bolts are provided for the articulated connection between the respective intermediate member and the associated star-shaped connecting rod, wherein at least one of the connecting bolts also forms a guide pin. This reduces the number of parts, which saves space, weight and costs. Preferably, at least two of the connecting bolts form the at least two guide pins. It is particularly preferred that all guide pins are formed by connecting bolts.

In order to further increase the magnitude of the transmittable torques, in a preferred embodiment of the coaxial transmission according to the invention it is provided that the toothings of the first end faces each have a plurality of teeth, preferably three teeth. The number of teeth on the toothing of the first end faces increases the surface area with which the respective piston can press against the internal toothing, which enables the transmission of particularly high torques between the crankshaft and the hollow shaft or optionally the guide unit.

In a preferred embodiment of the coaxial transmission according to the invention, it is provided that the crankshaft is of hollow design in order to be able to guide cables through the crankshaft without twisting, preferably along the axis of rotation.

In a preferred embodiment of the coaxial transmission according to the invention, it is provided that the pistons each have a toothing with at least one tooth on a second end face opposite the first end face, in that an inner ring with external toothing is provided which is mounted rotatably about the axis of rotation, wherein the guide unit is arranged at least in sections between the inner ring and the hollow shaft, wherein the toothings of the second end faces of the pistons can be brought successively into engagement with the external toothing and into a state disengaged from the external toothing, in order to further rotate the inner ring or the guide unit about the axis of rotation during the respective engagement, preferably with planar contact between the respective toothing and the external toothing.

The toothing of the second end faces can also be referred to as toothing embossed on the second end face.

Preferably, the inner ring is rotatably mounted around the axis of rotation and, provided it is not locked, has the function of a shaft in principle and could therefore also be referred to as an inner shaft. Its external toothing faces the internal toothing of the hollow shaft.

In principle, the same applies to the engagement of the toothing of the first end faces with the internal toothing of the hollow shaft as applies to the engagement of the toothing of the second end faces with the external toothing of the inner ring, which is why reference is generally made to the above. In particular, particularly high torques can be transmitted between the crankshaft and the inner ring or optionally the guide unit in the case of planar contact or planar pressing between the toothing of the second end face of the respective piston and the external toothing of the inner ring—in contrast to solutions with linear contact.

Furthermore, a plurality of teeth, in particular three thereof, can be provided on the toothing of the second end faces in order to transmit particularly high torques between the crankshaft and the inner ring or, optionally, the guide unit.

With a braked or fixed guide unit, one or each piston alternately drives the hollow shaft and the inner ring. Both the inner ring and the hollow shaft can act as the output. It is also possible for only the hollow shaft or the inner ring to act as the output, with the other element being braked or locked.

As the inner ring has a smaller diameter than the hollow shaft, lower tangential speeds can be achieved or tapped at the same angular speeds. This means that the inner ring and the hollow shaft can provide two outputs for different speeds at the same time, which may save a second transmission depending on the application.

The inner ring can, but does not have to, be connected to the hollow shaft in a rotationally fixed manner, wherein a connection can achieve a higher resolution of the coaxial transmission on the one hand and the transmission of even greater torques on the other.

Furthermore, embodiment variants with only two pistons are also theoretically conceivable, in which the inner ring ensures that the hollow shaft or optionally the guide unit is only moved in one specific direction due to the total of four (piston) engagements.

Finally, it is also possible for the inner ring to be rotated in the opposite direction to the direction of rotation of the hollow shaft.

In a preferred embodiment of the coaxial transmission according to the invention, the guide unit is arranged immovably with respect to the axis of rotation. In this case, the hollow shaft is moved further and acts as an output element. Optionally, the inner ring (if present) can also be moved further in such embodiment variants, which in turn can be braked or can act as an output element.

As already mentioned above, different or very high transmission ratios can be easily achieved by arranging several star connecting rods one behind the other along the axis of rotation on different crank pins. Accordingly, in a preferred embodiment of the coaxial transmission according to the invention, it is provided that with respect to rotational movements about the axis of rotation, the hollow shaft is locked or braked, in that a further crank pin is provided, in that a further piston set with a plurality of pistons is provided, each of which has a toothing with at least one tooth on a first end face facing away from the axis of rotation, in that a further star-shaped connecting rod is provided for connecting the pistons of the further piston set to the further crank pin, to which further star-shaped connecting rod the pistons of the further piston set are coupled, in that a further hollow shaft with internal toothing is provided, wherein at least the internal toothing of the further hollow shaft, as viewed in a plane normal to the axis of rotation, preferably the entire further hollow shaft, is arranged within the cross-section of the hollow shaft, and in that the pistons of the further piston set are each guided linearly in the guide unit and can be moved back and forth parallel to the radial direction, whereby, upon rotation of the guide unit about the axis of rotation, the toothings of the first end faces of the pistons of the further piston set can be brought successively into engagement with the internal toothing of the further hollow shaft and into a state disengaged from the internal toothing of the further hollow shaft, in order to further rotate the further hollow shaft about the axis of rotation during the respective engagement, preferably with planar contact between the respective toothing and the internal toothing of the further hollow shaft.

In this embodiment, the guide unit is not immovably arranged or blocked or braked relative to the axis of rotation, but the hollow shaft is.

The output takes place on the other hollow shaft.

The guide unit guides both the pistons of at least one piston set and the pistons of the other piston set.

The at least one crank pin and the further crank pin or further eccentric are arranged one behind the other as seen along the axis of rotation, wherein the at least one crank pin and the further crank pin do not necessarily have to follow one another directly or connect directly to one another. In other words, a distance can also be provided between these crank pins.

It is understood that it is possible a plurality of further crank pins, a plurality of further piston sets, a plurality of further star-shaped connecting rods and also a plurality of further hollow shafts are provided, wherein these are typically arranged one behind the other along the axis of rotation.

In the resulting two-stage or multi-stage design of the coaxial transmission, a comparatively higher number of teeth are involved in the power transmission, allowing even greater torques to be transmitted. On the other hand, comparatively higher transmission ratios can be realized, especially into the slow speed.

The total transmission ratio i is calculated from the number of teeth zf of the fixed or braked stage, i.e. from the number of teeth of the internal toothing of the hollow shaft, and the number of teeth za of the output stage, i.e. from the number of teeth of the internal toothing of the other hollow shaft, according to $i=za*(zf-1)/(za-zf)$. If, for example, the internal toothing of the hollow shaft has 42 teeth and the internal toothing of the additional hollow shaft has 41 teeth, this results in a total transmission ratio $i=-1681$, i.e. a very large transmission ratio to the slow speed (also known colloquially as a reduction ratio), since $|i|>>1$ applies. The negative sign indicates that the guide unit and the other hollow shaft rotate in opposite directions.

Accordingly, in order to realize a wide range of ratios and in particular to realize high ratios in a particularly preferred embodiment of the coaxial transmission according to the invention, it is provided that the internal toothing of the hollow shaft and the internal toothing of the further hollow shaft have a different number of teeth.

In principle, the eccentricities of the at least one crank pin and the other crank pin can be of different sizes. In a particularly preferred embodiment of the coaxial transmission according to the invention, it is provided that the at least one crank pin and the other crank pin have the same eccentricity. This proves advantageous with regard to good mass balancing.

Likewise, a certain crank pin offset not equal to zero proves to be favorable with regard to good mass balancing. In a particularly preferred embodiment of the coaxial transmission according to the invention, it is therefore provided that the at least one crank pin and the further crank pin are arranged rotated relative to each other with respect to the axis of rotation, preferably by 360°/h, where h is the total number of all crank pins.

A crank pin offset of 360°/h proves to be optimal with regard to mass balancing, wherein h is the sum of the number of at least one crank pin and the further crank pin. If, for example, exactly one crank pin and exactly one further crank pin are provided in the aforementioned embodiment of the coaxial transmission, this results in a crank pin offset of 360°/2=180° between the crank pin and the further crank pin with h=2.

BRIEF DESCRIPTION OF THE DRAWINGS

The invention will now be explained in more detail with reference to exemplary embodiments. The drawings are exemplary and are intended to illustrate the idea of the invention, but are in no way intended to restrict it or even represent it conclusively.

The Drawings Show as Follows.

DETAILED DESCRIPTION OF THE PREFERRED EMBODIMENTS

Figure 1:
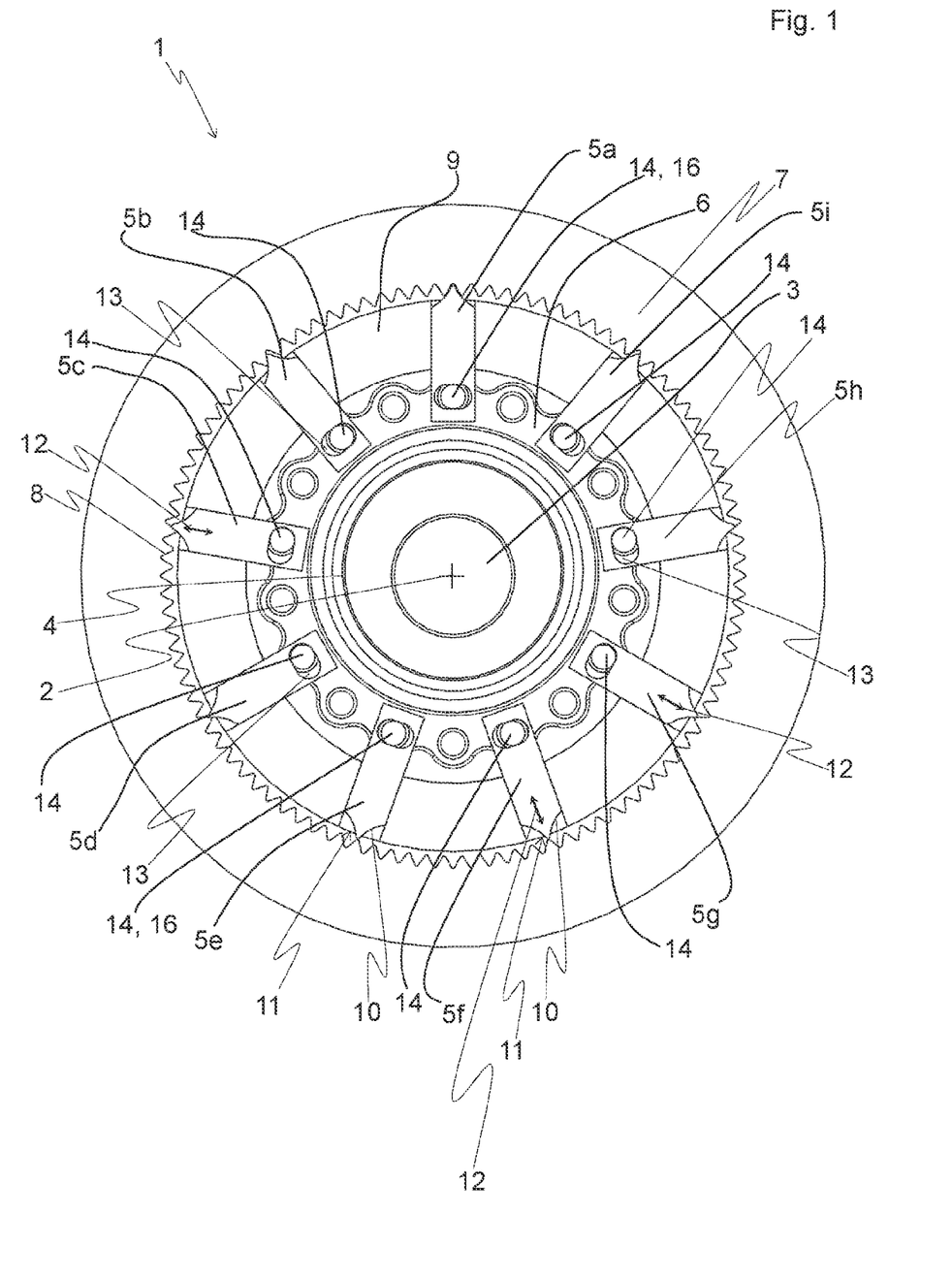
FIG. 1 shows a schematic sectional view of a first exemplary embodiment of a coaxial transmission according to the invention.

The sectional view in FIG. 1 shows a first exemplary embodiment of a coaxial transmission 1 according to the invention. The coaxial transmission 1 has a crankshaft 3, which is rotatable about an axis of rotation 2 and has a crank pin 4, which can be seen in FIG. 1 and forms an eccentric, which rotates about the axis of rotation 2 when the crankshaft 3 rotates.

The coaxial transmission 1 of the first exemplary embodiment also has a piston set with nine pistons 5*a-i*. Each of these pistons 5*a-i* has an embossed toothing 11 with a tooth on a first end face 10 facing away from the axis of rotation 2.

Furthermore, a hollow shaft 7 is provided in the coaxial transmission 1, which has internal toothing 8. In the image plane of FIG. 1, which is perpendicular to the axis of rotation 2, the pistons 5*a-i*—and at least in sections the crankshaft 3—are arranged inside the hollow shaft 7. This also applies to a guide unit 9, in which the pistons 5*a-i* are each guided linearly and can each be moved back and forth parallel to a radial direction 12 that is perpendicular to the axis of rotation 2. For this purpose, the guide unit 9 has hollow cylinders in the illustrated exemplary embodiments, which act as linear guides for the pistons 5*a-i*. The pistons 5*a-i* have a circular cross-section in sections that are arranged in the hollow cylinders of the guide unit 9, wherein the respective cross-section lies in a plane normal to the respective radial direction 12.

By moving the pistons 5*a-i* back and forth, the toothings 11 of the first end faces 10 of the pistons 5*a-i* are successively brought into engagement with the internal toothing 8 and into a state disengaged from the internal toothing 8, wherein due to the linear movement of the pistons 5*a-i* during the respective engagement, a planar contact between the respective toothing 11 and the internal toothing 8 can be ensured and the respective toothing 11 presses against the internal toothing 8 over a large area. As a result, the hollow shaft 7 is rotated a little further around the axis of rotation 2 if the guide unit 9 is arranged immovably relative to the axis of rotation 2 or if the guide unit 9 is arranged rotatably around the axis of rotation 2 but is braked. If, on the other hand, the hollow shaft 7 is fixed or immovable relative to the axis of rotation 2 or is braked, the guide unit 9 (which is mounted to rotate about the axis of rotation 2) is rotated a little further. Due to the planar engagement or pressing, very high torques can be transmitted from the crankshaft 3 to the hollow shaft 7 or optionally the guide unit 9.

Figure 2:
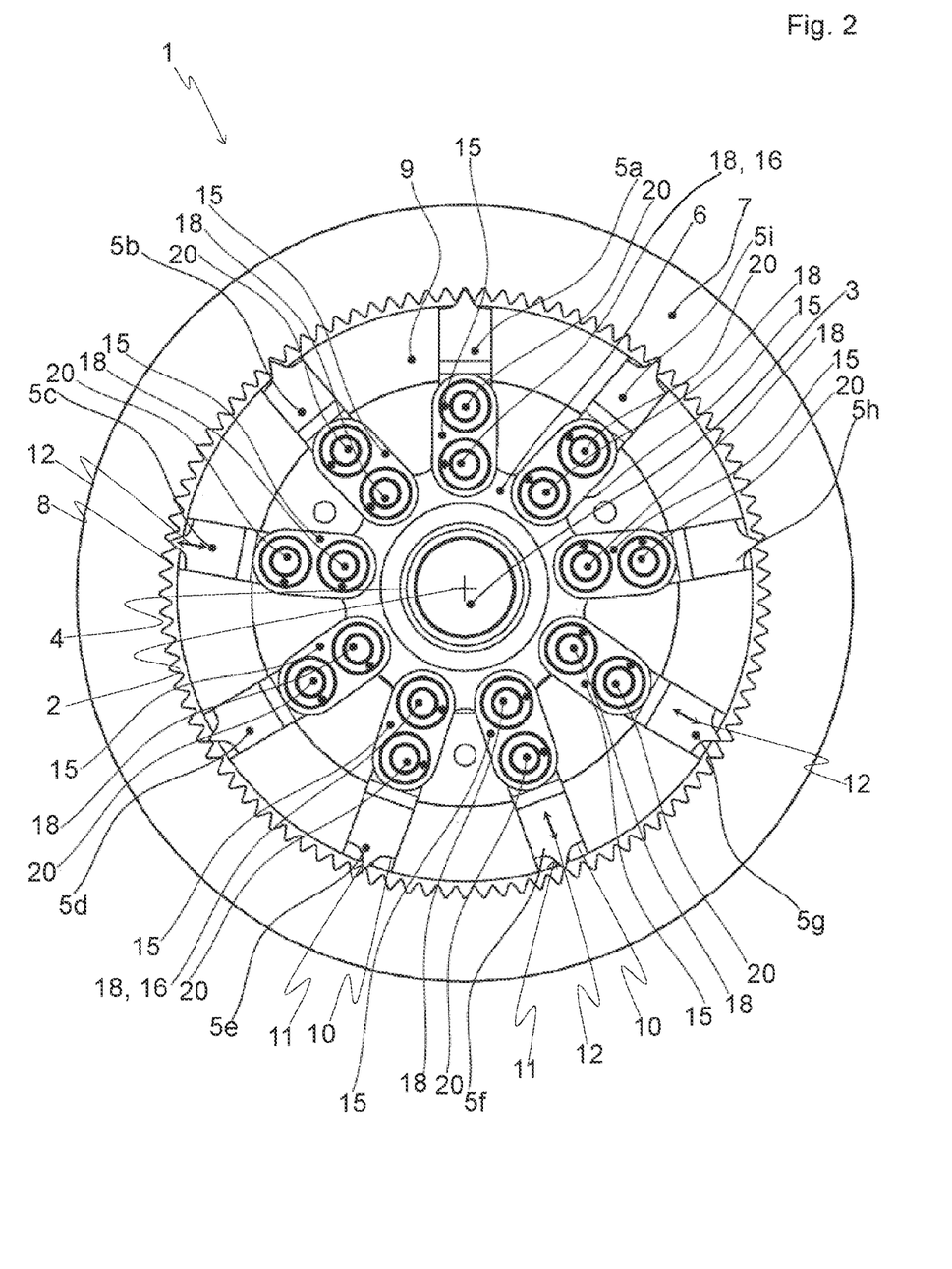
FIG. 2 shows a schematic sectional view of a second exemplary embodiment of the coaxial transmission according to the invention.
Figure 3:
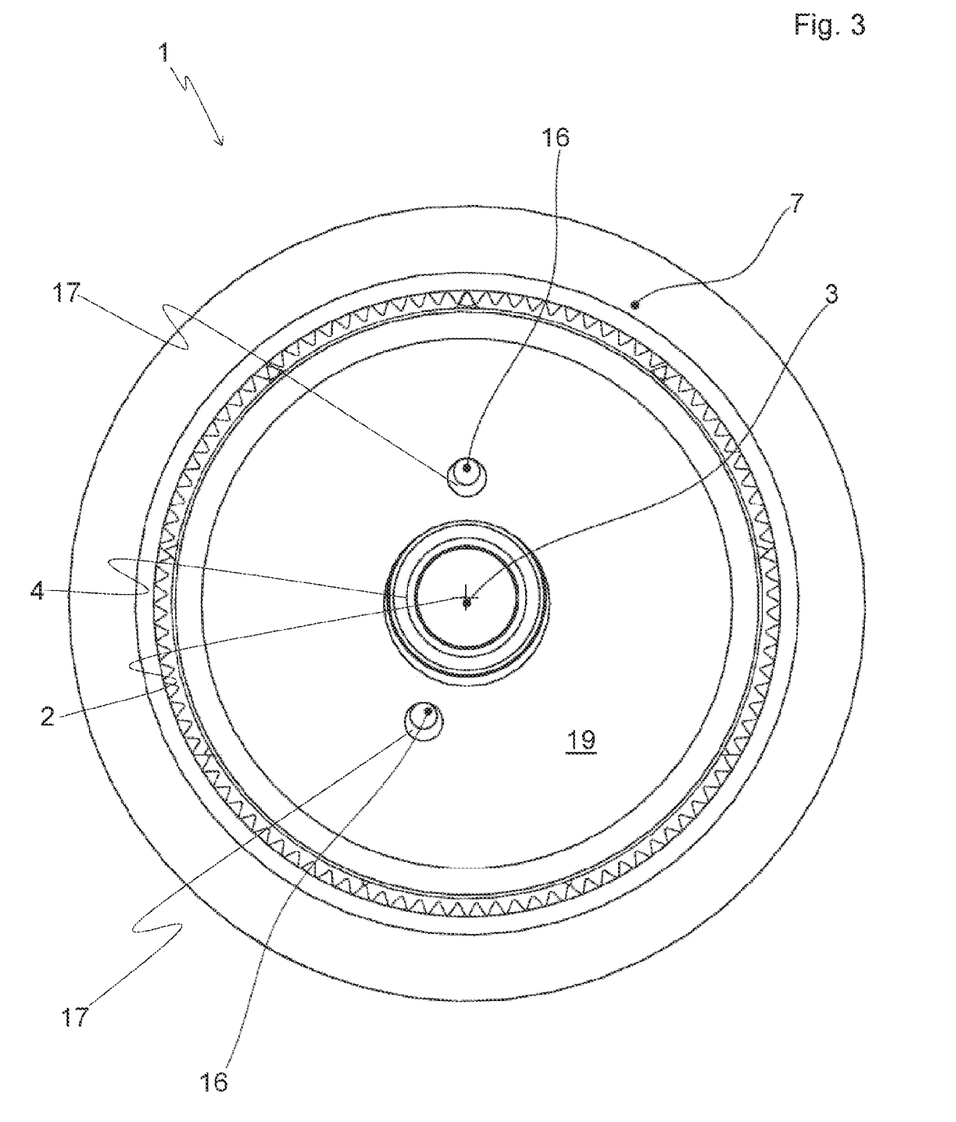
FIG. 3 shows a schematic sectional view of the second exemplary embodiment of the coaxial transmission according to the invention, in which a guide section is recognizable.

In the exemplary embodiments shown in FIGS. 1-3, the guide unit is preferably arranged immovably relative to the axis of rotation 2, so that the hollow shaft 7 is moved when the crankshaft 3 rotates.

To connect the pistons 5*a-i* of the piston set to the crank pin 4, a common, star-shaped connecting rod 6 is provided according to the invention, to which the pistons 5*a-i* are coupled. In the exemplary embodiments shown, this results in an essentially offset-free arrangement of the pistons 5*a-i* relative to each other in relation to the axis of rotation 2, which—despite the relatively high number of pistons 5*a-i*—results in an extremely small overall length of the coaxial transmission 1 measured parallel to the axis of rotation 2. At the same time, the relatively high number of pistons 5*a-i* results in a very homogeneous application of force and extremely high torques can also be transmitted.

To secure an orbital movement and to prevent further rotation relative to the guide unit 9 of the star-shaped connecting rod 6, two guide pins 16 are provided in each of the exemplary embodiments shown in FIGS. 1-3, which are rigidly connected to the star-shaped connecting rod 6 and project from it parallel to the axis of rotation 2. The guide pins 16, in particular sections of the guide pins 16 having free ends, are in engagement with corresponding recesses 17 of a guide section 19 or are arranged in sections in the recesses 17, see FIG. 3, wherein the guide section 19 is arranged immovably relative to the guide unit 9 or is connected thereto. In the illustrated exemplary embodiments, the corresponding recesses 17 are designed as bores, with the dimensions of the recesses 17 being adapted to the eccentricity of the crank pin 4.

The coupling between the pistons 5*a-i* and the star-shaped connecting rod 6 can be achieved in a wide variety of ways. In the first exemplary embodiment, which is shown in FIG. 1, slotted holes 13 are provided in the pistons 5*a-i* of the piston set for coupling the pistons 5*a-i* to the associated star-shaped connecting rod 6, which extend transversely to the respective radial direction 12, wherein coupling bolts 14 are fastened to the star-shaped connecting rod 6, which are in engagement with the slotted holes 13 or are arranged in sections in the slotted holes 13. This means that the pistons 5*a-i* move according to the principle of a crank loop. In the exemplary embodiment shown, the slotted holes 13 extend essentially in a straight line and essentially normal to the respective radial direction 12 and essentially normal to the axis of rotation 2. The coupling bolts 14 in turn extend essentially parallel to the axis of rotation 2 or project from the star-shaped connecting rod 6 parallel to the axis of rotation 2.

In the first exemplary embodiment according to FIG. 1, two of the coupling bolts 14 form the guide pins 16 in that these coupling bolts 14 are slightly longer than the remaining coupling bolts 14 and project through the respective slotted hole 13 into the respective recess 17 of the guide section 19. This further reduces the number of parts.

The second exemplary embodiment, which is shown in FIG. 2, differs from the first exemplary embodiment only in the coupling of the pistons 5*a-i* to the star-shaped connecting rod 6, which is why reference is made to the above with regard to the basic mode of operation of the coaxial transmission 1. Specifically, the second exemplary embodiment provides that intermediate members 15 are provided for coupling the pistons 5*a-i* of the piston set to the star-shaped connecting rod 6, which are essentially rigid, wherein each intermediate member 15 is connected in an articulated manner to the associated piston 5*a-i* on the one hand and connected in an articulated manner to the star-shaped connecting rod 6 on the other.

In the illustrated exemplary embodiment, connecting bolts 18 are provided for the articulated connection between the respective intermediate member 15 and the star-shaped connecting rod 6, which define pivot joints or their axes of rotation, wherein these axes of rotation are parallel to the axis of rotation 2. The connecting bolts 18 project from the star-shaped connecting rod 6 parallel to the axis of rotation 2. In order to save parts, two of the connecting bolts 18 also form the guide pins 16, in that these connecting bolts 18 are slightly longer than the remaining connecting bolts 18 and project into the respective recess 17 of the guide section 19, see FIG. 3.

The articulated connection between the respective intermediate member 15 and the associated piston 5*a-i* is realized in the second exemplary embodiment shown in each case by means of a pivot joint 20, with the axes of rotation of the pivot joints 20 extending parallel to the axis of rotation 2.

In the two exemplary embodiments shown in FIG. 1 and FIG. 2, the crankshaft 3 is hollow along the axis of rotation 2, which allows cables (not shown) to be fed through without twisting, for example.

Figure 4:
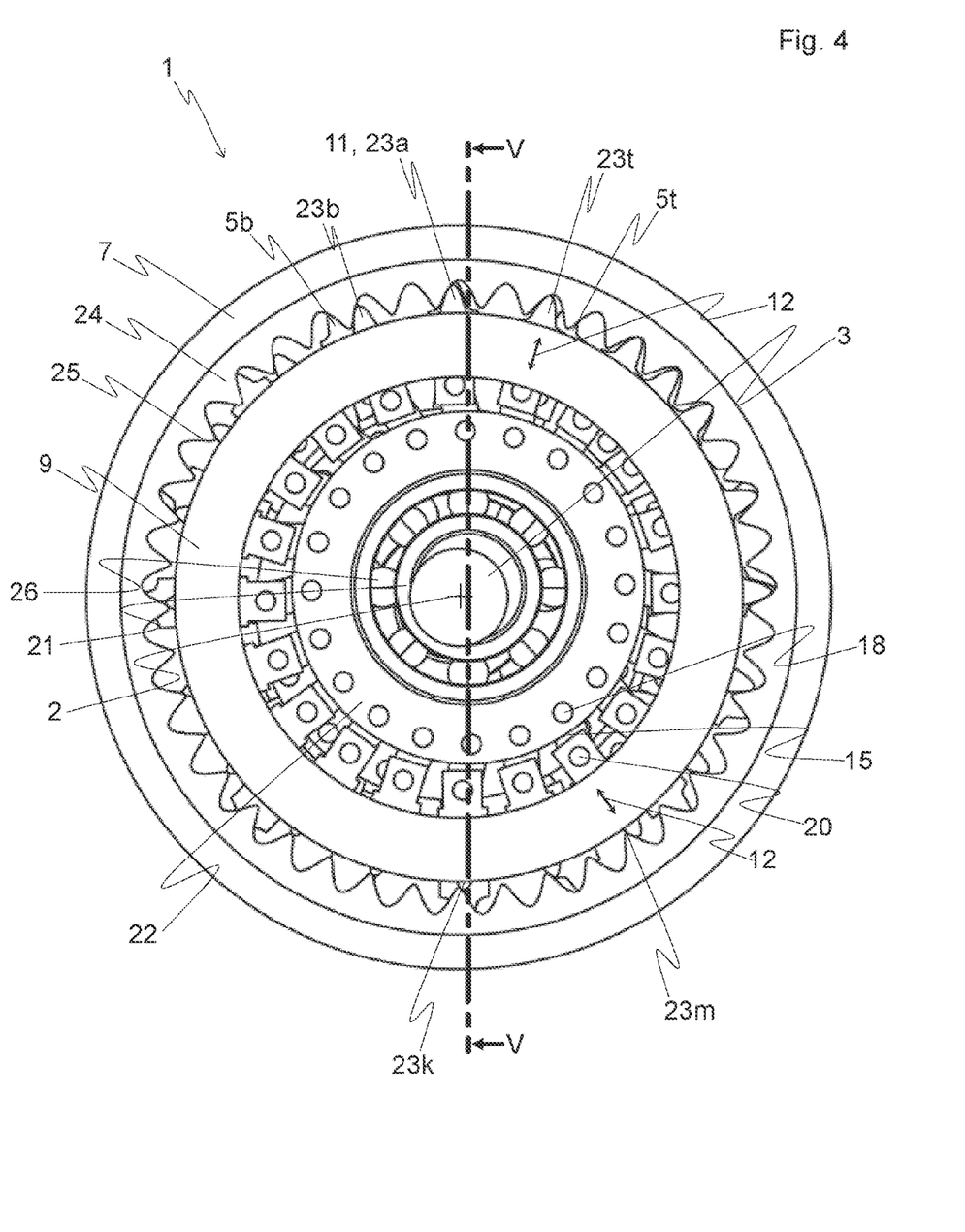
FIG. 4 shows a schematic sectional or end view of a third exemplary embodiment of the coaxial transmission according to the invention.

Unless otherwise stated, the above applies to the third exemplary embodiment and is therefore not repeated. In the third exemplary embodiment, which is shown in FIG. 4, FIG. 5 and FIG. 6, the guide unit 9 is not arranged immovably or locked or braked in relation to rotational movements about the axis of rotation 2, but the hollow shaft 7 is locked or braked.

In this case, the coaxial transmission 1 comprises a further crank pin 21 and a further piston set with a plurality of pistons 23a-t, each of which has a toothing 11 with at least one tooth on a first end face 10 facing away from the axis of rotation 2.

Figure 5:
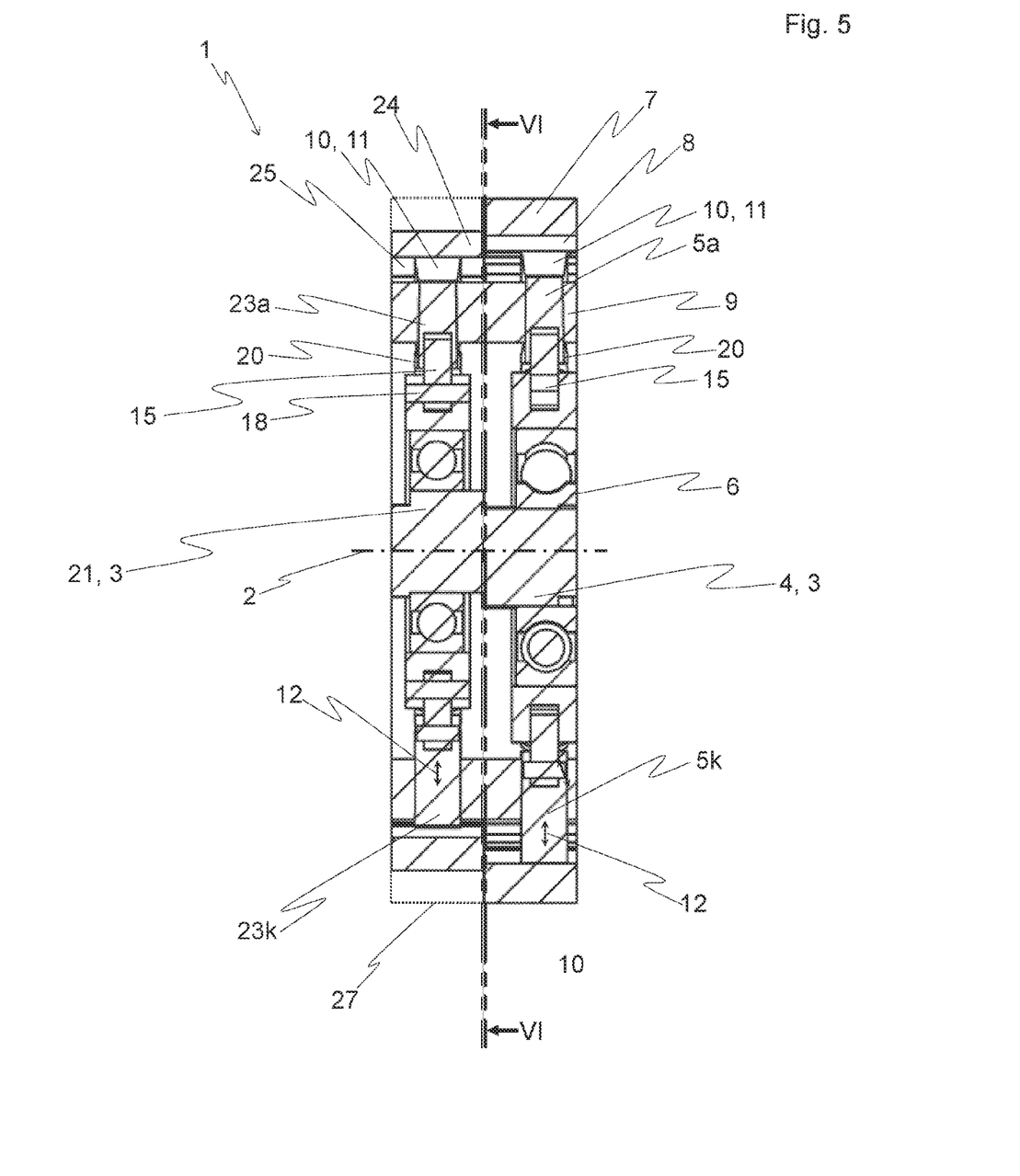
FIG. 5 shows a schematic sectional view of the third exemplary embodiment according to the sectional line V-V in FIG. 4, with arrows indicating the direction of view.
Figure 6:
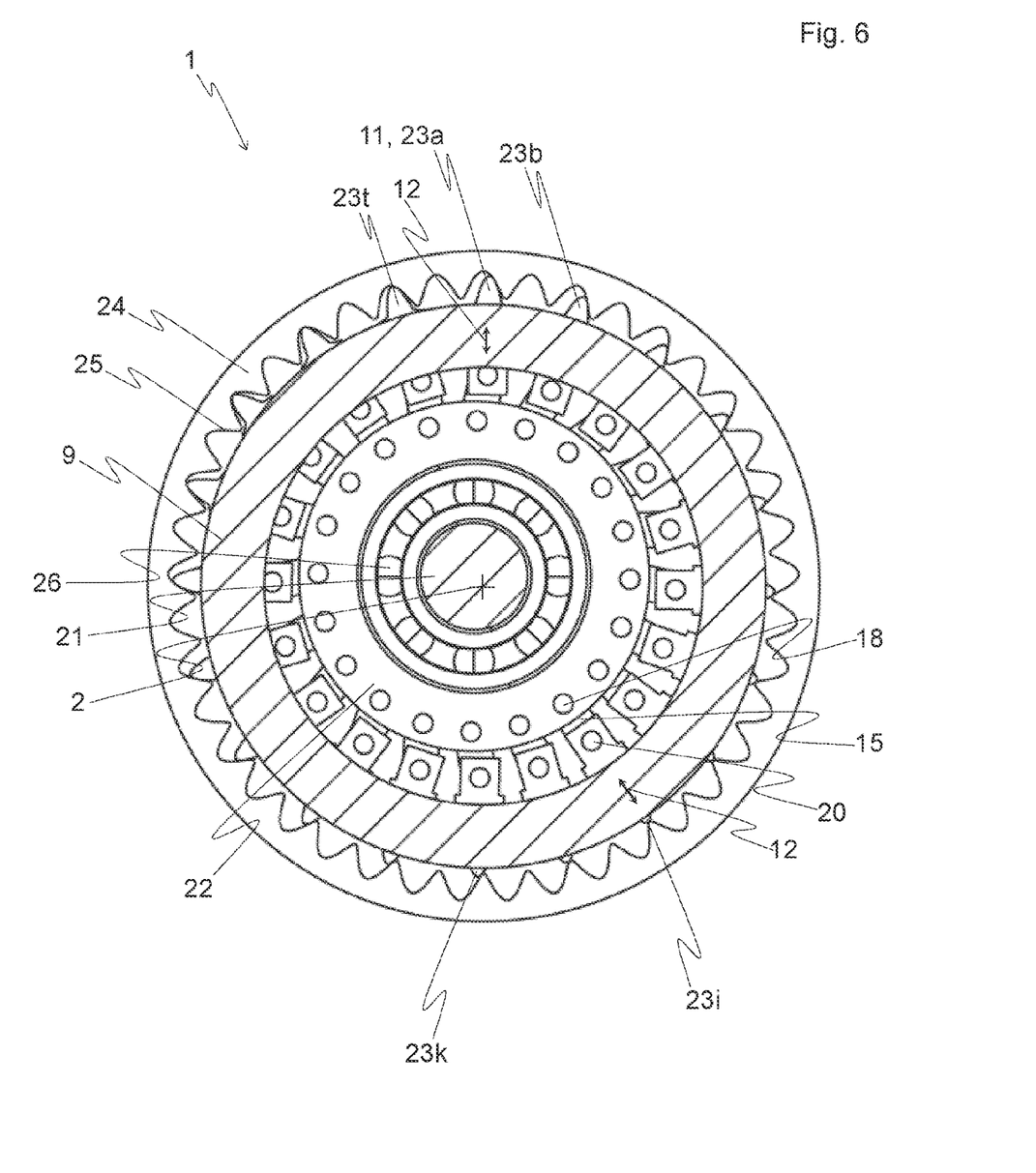
FIG. 6 shows a schematic sectional view of the third exemplary embodiment according to sectional line VI-VI in FIG. 5, with arrows indicating the direction of view.

In this exemplary embodiment, the eccentric shaft or crankshaft 3 is manufactured in one piece with the eccentric or crank pin 4 and the further eccentric or crank pin 21, wherein the crank pins 4, 21 are arranged directly one behind the other as seen along the axis of rotation 2, see FIG. 5.

To connect the pistons 23a-t of the further piston set to the further piston pin 21, a further star-shaped connecting rod 22 is provided, to which the pistons 23a-t of the further piston set are coupled.

To couple the pistons 23a-t with the further star-shaped connecting rod 22, intermediate members 15 are again provided—in this case not of the star-shaped connecting rod 6, but of the further star-shaped connecting rod 22. The intermediate members 15 are rotatably mounted on the side of the further star-shaped connecting rod 22 by means of connecting bolts 18 and rotatably mounted on the side of the pistons 23a-t by means of pivot joints 20, with the associated axes of rotation extending parallel to the axis of rotation 2.

The further star-shaped connecting rod 22 is mounted on the further crank pin 21—analogous to the bearing arrangement of the star-shaped connecting rod 6 on the crank pin 4—by means of a bearing arrangement, which in the illustrated exemplary embodiment is formed by a needle bearing 26.

In the third exemplary embodiment shown, the coaxial transmission 1 also comprises a further hollow shaft 24 with internal toothing 25, wherein the entire further hollow shaft 24 is arranged within the cross-section of the hollow shaft 7 when viewed in a plane normal to the axis of rotation 2, see in particular FIG. 4 and FIG. 5.

In the third exemplary embodiment shown, the hollow shaft 7 and the further hollow shaft 24 are arranged one behind the other as seen along the axis of rotation 2 in such a way that the further hollow shaft 24 lies outside the hollow shaft 7 and directly adjoins it. However, it would of course also be possible for the hollow shaft 7 to project beyond the further hollow shaft 24 parallel to the axis of rotation 2, in particular with a section 27 of the hollow shaft 7 that has no internal toothing 8. Instead, this internally toothless section 27 of the hollow shaft 7 can form a bearing, in particular a plain bearing, for the further hollow shaft 24. Such a possible geometry or design of the hollow shaft 7 with an internally toothless section 27 is indicated by the dotted lines in FIG. 5.

The pistons 23a-t of the additional piston set—like the pistons 5a-t of the piston set—are each guided linearly in the guide unit 9 and can be moved back and forth parallel to the radial direction 12. As a result, when the guide unit 9 rotates about the axis of rotation 2, the toothings 11 of the first end faces 10 of the pistons 23a-t of the further piston set are successively brought into engagement with the internal toothing 25 of the further hollow shaft 24 and into a state disengaged from the internal toothing 25 of the further hollow shaft 24 in order to further rotate the further hollow shaft 24 about the axis of rotation 2 during the respective engagement, preferably with planar contact between the respective toothing 11 and the internal toothing 25 of the further hollow shaft 24.

In this way, a two-stage coaxial transmission 1 is realized, wherein the further hollow shaft 24 acts as the output and particularly high transmission ratios can be realized. In this context, the internal toothing 8 of the hollow shaft 7 and the internal toothing 25 of the additional hollow shaft 24 have a different number of teeth in the third exemplary embodiment shown.

Specifically, in the third exemplary embodiment shown, the number of teeth za of the internal toothing 25 of the further hollow shaft 24 is za=41 and the number of teeth zf of the internal toothing 8 of the hollow shaft 7 is zf=42. This results in the total transmission ratio $i=za*(zf-1)/(za-zf)=-1681$, i.e. a very high transmission ratio to slow speed, with the guide unit 9 and the further hollow shaft 24 rotating in opposite directions.

In the third exemplary embodiment shown, the crank pin 4 and the other crank pin 21 have the same eccentricity, see FIG. 5, which has a positive effect with regard to mass balancing.

Furthermore, in the third exemplary embodiment shown, a crank pin offset of 180° is provided to optimize the mass balance. This means that the crank pin 4 and the other crank pin 21 are arranged rotated by 180° in relation to the axis of rotation 2, see FIG. 5.

LIST OF REFERENCE SIGNS

1 Coaxial transmission
2 Axis of rotation
3 Crankshaft
4 Crank pin
5a-i, j-t Piston
6 Star-shaped connecting rod
7 Hollow shaft
8 Internal toothing of the hollow shaft
9 Guide unit
10 First end face of the piston
11 Toothing on the first end face
12 Radial direction
13 Slotted hole
14 Coupling bolt
15 Intermediate member
16 Guide pin
17 Recess
18 Connecting bolt
19 Guide section
20 Pivot joint
21 Further crank pin
22 Further star-shaped connecting rod
23a-t Piston of a further piston set
24 Further hollow shaft
25 Internal toothing of the further hollow shaft
26 Needle bearing
27 Internally toothless section of the hollow shaft

The invention claimed is:

1. A coaxial transmission, comprising:
a crankshaft which can be rotated about an axis of rotation and has a crank pin;
a piston set which has a plurality of pistons which each have a toothing with at least one tooth on a first end face facing away from the axis of rotation;
a hollow shaft having an internal toothing, wherein the plurality of pistons is arranged within the hollow shaft when viewed in a plane normal to the axis of rotation;

a guide unit, wherein each piston of the plurality of pistons is guided linearly in the guide unit and can be moved back and forth parallel to a radial direction normal to the axis of rotation, wherein the toothing of each of the plurality of pistons can be brought successively into a state of engagement with the internal toothing and into a state of disengagement from the internal toothing in order, during the state of engagement, to further rotate the hollow shaft or the guide unit about the axis of rotation; and a common, star-shaped connecting rod, to which the plurality of pistons of the piston set are coupled, wherein the common, star-shaped connecting rod connects the plurality of pistons of the piston set to the crank pin.

2. The coaxial transmission according to claim 1, wherein the piston set comprises a plurality of piston sets, and the common, star-shaped connecting rod comprises a plurality of common, star-shaped connecting rods, wherein a respective common, star-shaped connecting rod of the plurality of common, star-shaped connecting rods is provided for a respective piston set of the plurality of piston sets, to which the plurality of pistons of the respective piston set are coupled.

3. The coaxial transmission according to claim 1, further comprising at least two guide pins for securing an orbital movement and against further rotation relative to the guide unit which guide pins are rigidly connected to the common, star-shaped connecting rod and are in engagement with a corresponding recess of a guide section, which is arranged immovably relative to the guide unit.

4. The coaxial transmission according to claim 3, further comprising rollers provided on the guide pins in order to facilitate rolling on the guide section when the guide pins move in the corresponding recess.

5. The coaxial transmission according to claim 1, further comprising a plurality of slotted holed provided in the plurality of pistons for coupling the plurality of pistons of the piston set to the common, star-shaped connecting rod, which slotted holes extend transversely to the radial direction, and a plurality of coupling bolts fastened to the common, star-shaped connecting rod and engaged with the slotted holes.

6. The coaxial transmission according to claim 5, wherein at least one of the plurality of coupling bolts comprises a guide pin.

7. The coaxial transmission according to claim 1, further comprising a plurality of intermediate members of essentially rigid design for coupling the plurality of pistons of the piston set to the common, star-shaped connecting rod, wherein each intermediate member of the plurality of intermediate members is connected in an articulated manner to a respective piston of the plurality of pistons and is connected in an articulated manner to the common, star-shaped connecting rod.

8. The coaxial transmission according to claim 7, further comprising a plurality of connecting bolts for connecting a respective intermediate member of the plurality of intermediate members to the common, star-shaped connecting rod in the articulated manner, wherein at least one of the plurality of connecting bolts comprises a guide pin.

9. The coaxial transmission according to claim 1, wherein the toothing of the first end face has a plurality of teeth.

10. The coaxial transmission according to claim 1, wherein the crankshaft is of hollow design.

11. The coaxial transmission according to claim 1, wherein each of the plurality of pistons has a toothing with at least one tooth on a second end face opposite the first end face, wherein an inner ring with an external toothing is provided which is mounted rotatably about the axis of rotation, wherein the guide unit is arranged at least in sections between the inner ring and the hollow shaft, wherein the toothing of the second end face can be brought successively into a state of engagement with the external toothing and into a state disengaged from the external toothing, in order to further rotate the inner ring or the guide unit about the axis of rotation during the state of engagement.

12. The coaxial transmission according to claim 1, wherein the guide unit is arranged immovably with respect to the axis of rotation.

13. The coaxial transmission according to claim 1, wherein, with respect to rotational movements about the axis of rotation, the hollow shaft is locked or braked, the coaxial transmission further comprising:

a further crank pin;

a further piston set with a further plurality of pistons, which each have a toothing with at least one tooth on a first end face facing away from the axis of rotation;

a further common, star-shaped connecting rod for connecting the further plurality of pistons of the further piston set to the further crank pin, to which further common, star-shaped connecting rod of the further plurality of pistons of the further piston set are coupled; and a further hollow shaft having an internal toothing, wherein at least the internal toothing of the further hollow shaft, as viewed in a plane normal to the axis of rotation is arranged within a cross-section of the hollow shaft, and wherein the further plurality of pistons of the further piston set are each guided linearly in the guide unit and can be moved back and forth parallel to the radial direction wherein, upon rotation of the guide unit about the axis of rotation, the toothings of the first end faces of the further plurality of pistons of the further piston set can be brought successively into a state of engagement with the internal toothing of the further hollow shaft and into a state disengaged from the internal toothing of the further hollow shaft, in order to further rotate the further hollow shaft about the axis of rotation during the state of engagement.

14. The coaxial transmission according to claim 13, wherein the internal toothing of the hollow shaft and the internal toothing of the further hollow shaft have a different number of teeth.

15. The coaxial transmission according to claim 13, wherein the crank pin and the further crank pin have a same eccentricity.

16. The coaxial transmission according to claim 13, wherein the crank pin and the further crank pin are arranged rotated relative to each other with respect to the axis of rotation.

* * * * *